United States Patent [19]

Egey

[11] 4,140,872

[45] Feb. 20, 1979

[54] CONTROL SYSTEM FOR FUNCTIONAL SEQUENCES

[75] Inventor: Thomas Egey, Neukeferloh, Fed. Rep. of Germany

[73] Assignee: Siemens Aktiengesellschaft, Berlin & Munich, Fed. Rep. of Germany

[21] Appl. No.: 860,606

[22] Filed: Dec. 14, 1977

[30] Foreign Application Priority Data

Dec. 17, 1976 [DE] Fed. Rep. of Germany ....... 2657404

[51] Int. Cl.² .................. H04L 13/10; H04Q 9/00; H03K 17/28
[52] U.S. Cl. .......................... 178/17 C; 178/23 R; 340/147 P; 340/365 R
[58] Field of Search ........ 340/147 P, 365 R, 147 MT; 235/151.11, 92 ME; 178/17 C, 2 R, 3, 17 R

[56] References Cited

U.S. PATENT DOCUMENTS 3,361,875  1/1968  Banfalvi et al. .................. 340/365 R
3,944,980  3/1976  Riedmayr .......................... 340/147 P

FOREIGN PATENT DOCUMENTS 1201462  9/1965  Fed. Rep. of Germany ....... 340/147 P
1373064  11/1973  United Kingdom.

Primary Examiner—Thomas A. Robinson
Attorney, Agent, or Firm—Hill, Gross, Simpson, Van Santen, Steadman, Chiara & Simpson

[57] ABSTRACT

A control system is disclosed for the control of sequential flow of functions in teletypewriters and data typewriters. Input signals are presented to the control system which release the carrying out of the functions. The control system produces output signals which correspond to individual steps of the functions to be carried out successively. A plurality of control units are provided in the control system with each of the control units being provided with a respective allocator. The control units produce control signals which are formed in accordance with the state of signals presented at inputs of the control units. These control unit input signals may correspond to the control system input signals and/or the control signals at the outputs of the control units. At least a portion of the control signals are utilized as the output signals for the control system.

7 Claims, 4 Drawing Figures

CONTROL SYSTEM FOR FUNCTIONAL SEQUENCES

BACKGROUND OF THE INVENTION

The invention relates to a control system for the control of the sequential flow of functions in an apparatus, particularly in teletypewriters or data typewriters. The control system to which input signals are connected releases the carrying-out of functions and produces output signals assigned to individual steps of the functions to be carried out at successive points in time.

Control systems are provided in communications technology equipment and electronic data processing. They control the sequential or chronological flow of functions in the apparatus. These control systems are normally constructed of a multiplicity of binary logic elements and storage elements. These logic elements and storage elements are put together by the designer of such a control system. The type and number of the logic elements and storage elements and also their arrangement in the control system in prescribed functions to be carried out are determined in accordance with the estimates of the designer. The internal logical functions of the control system are completely defined by this process and are documented in the form of a logic plan. The consequence of this is that the structure of the control system, particularly in irregular networks, is not uniform and is topographically very complicated. Therefore the diagram becomes unclear and function alterations can only be carried out with great difficulty. Furthermore, the description of the control systm must proceed on the level of the logic and storage elements as only at this level are the logical functions completely defined.

SUMMARY OF THE INVENTION

It is an object of the invention to disclose a control system in which the structure of the logic and storage elements is predefined so that a flow diagram illustrating an arbitrary function can be unequivocally imaged by the logic elements and storage elements.

The objective is inventively resolved with a control system of the invention wherein the control system contains a multiplicity of control units which are respectively provided with an allocator that produces control signals in dependence upon signals at its inputs, that the input signals and/or the control signals connect with the inputs of the control units, and that at least some of the control signals represent the output signals.

The control system in accordance with the present invention has the advantage that it exhibits a topographically simple structure, and in conjunction with the flow diagrams simplicity even with complicated functions is provided. Furthermore, the construction of the control unit is very well suited for simulations in data processing setups.

A particularly uncomplicated structure of the control system is obtained when the control units are hierarchically arranged, wherein a first control unit controls the execution of a main function, and additional control units control the execution of secondary functions.

In case a multiplicty of functions is to proceed in parallel, it is of advantage when the control units are arranged in parallel, whereby each control unit controls the execution of at least one function.

The production of individual steps of the functions to be carried out which are allocated to the output signals is obtained in a simple manner when each control unit contains a counter which can be continuously switched by means of counting impulses. An output of the counter is connected to the inputs of the allocator which respectively calls portions of the allocator which are assigned to individual component functions, depending upon its counter position.

The control unit is inexpensive if at least one control stage is provided for the execution of special functions which has control signals connected to its inputs and whose outputs can be connected to inputs of the control units. Such special functions can be storage fields, counters, arithmetic logic units etc.

A uniform design of the control system is obtained since the allocators are respectively formed from a plurality of logic elements carrying out an AND function. Additional logic elements are connected at an output side of the first mentioned logic elements to carry out an OR function.

One control unit and one sample embodiment of a control system in accordance with the invention are shown in the drawings.

DESCRIPTION OF THE PREFERRED EMBODIMENTS

Figure 1:
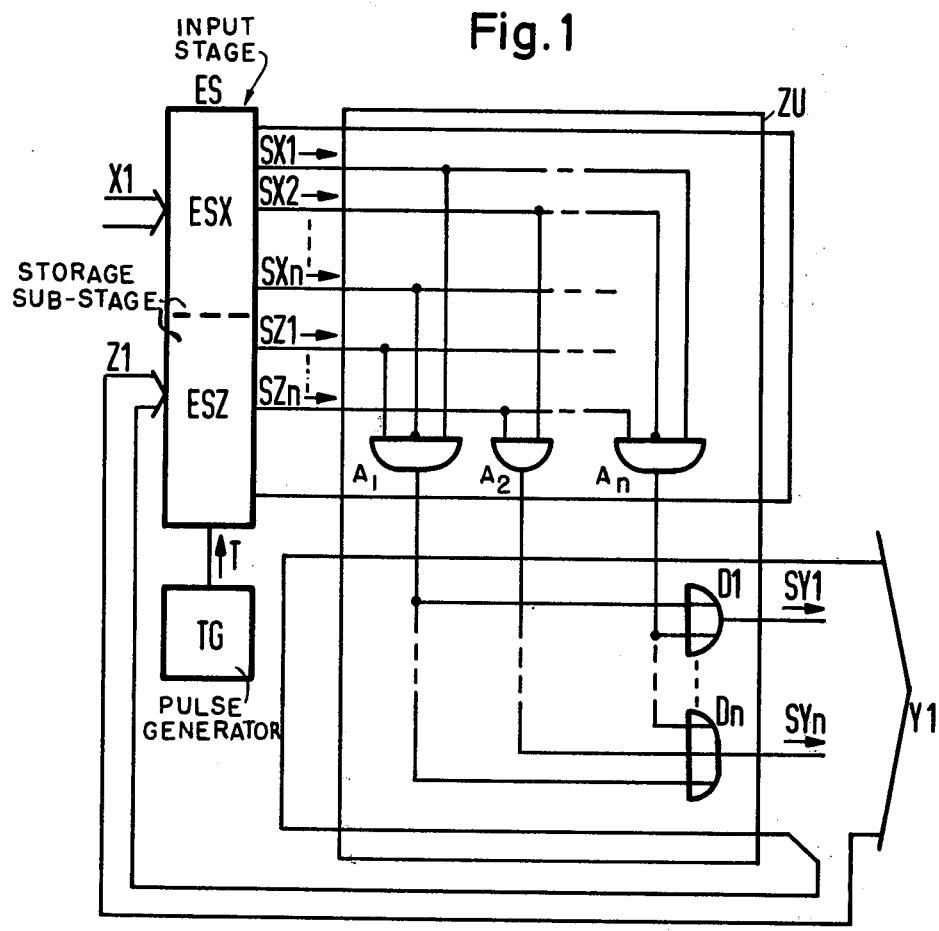
FIG. 1 illustrates a block circuit diagram of a control unit of the control system.

The control unit illustrated in FIG. 1 contains an allocator ZU, an input stage ES, and also a pulse generator TG. Signals X1 are conveyed to the control unit which are output by an input unit, for example, a keyboard. The control unit provides control signals Y1 at its output which are conveyed to an apparatus to be controlled, for example to a teletypewriter or data typewriter. The input stage ES consists of a first sub-stage ESX, in which the signals X1 can be intermediately stored. This sub-stage, however, is not necessarily required as, for example, the signals X1 can also be stored in the input unit of the keyboard, for example, as described above. Signals Z1 which represent a portion of the control signals Y1 are intermediately stored in a second sub-stage ESZ of the input stage ES. The conveyance of the signals X1 or Z1 into the input stage results with the aid of clock pulses T produced in the pulse generator TG. After each clock pulse T, the control signals Y1 assume values which are corresponding to the signals X1 and Z1 before the clock pulse T. This occurs for each of the clock pulses. The allocation proceeds with the aid of the allocator ZU which, for example, consists of a fixed value store or of an AND field formed of a multiplicity of AND elements A1 through A$n$, and of an OR field which is connected at the output side and formed of a multiplicity of OR elements D1 through D$n$. The control signal SY1, for example, assumes the binary value of 1 when the signals SX1 and SZ1 have the binary value of 1, and the signal SX$n$ has simultaneously the binary value of 0 at the input of the allocator or when the signals SX1 and SZ$n$ have the binary value of 1 and the signal SX2 has the binary value of 0.

Allocators which are formed from an AND and an OR field are already known and are available under the name PLA (programmable logic array) modules. Such modules, however, did not generally succeed as they do not exhibit a module-like structure since the chronological function flows cannot readily be observed and regular sequential networks such as counters, shift registers, etc. can only be reproduced in a very redundant manner.

Figure 2:
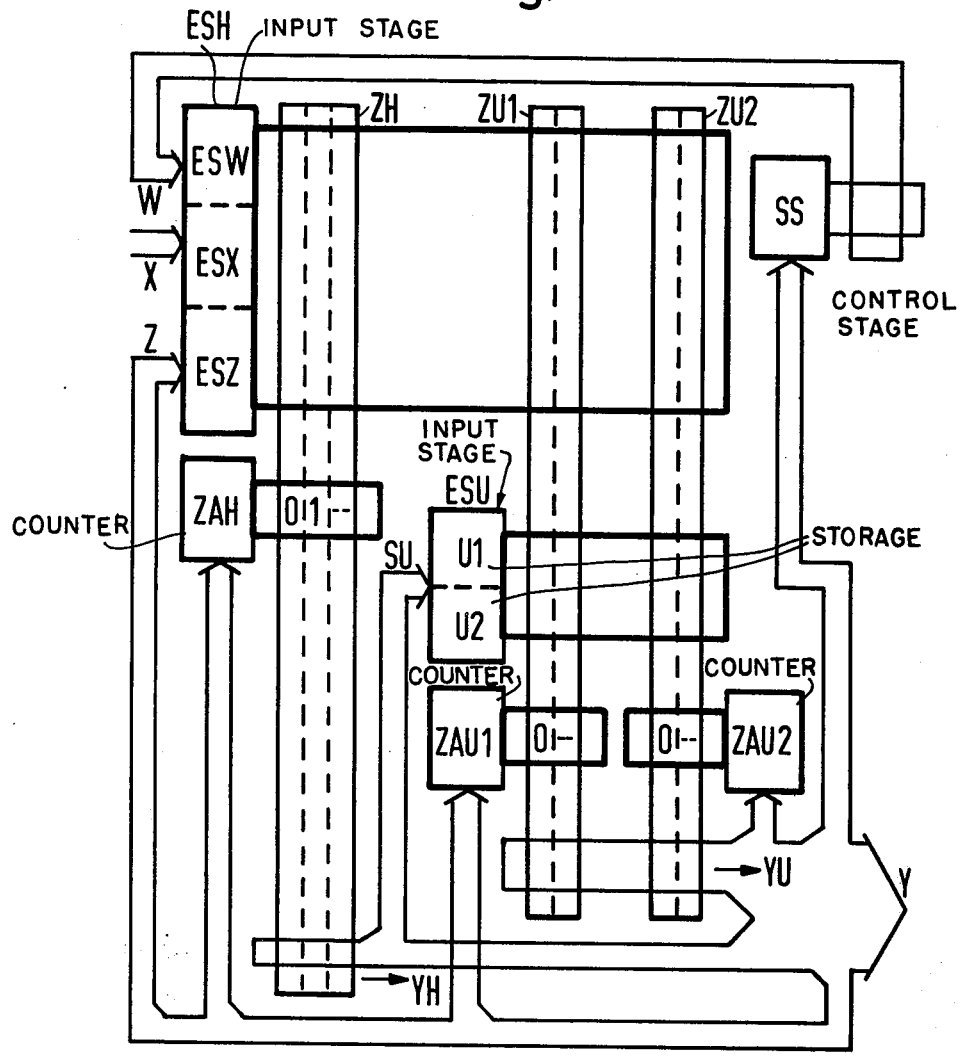
FIG. 2 illustrates a block circuit diagram of the control system.

The control system illustrated in FIG. 2 exhibits a hierarchical design of a multiplicity of control units. Each of these control units is similarly constructed as the control unit illustrated in FIG. 1. Each of these control units contains in addition to respective allocators ZH, ZU1, ZU2 an additional counter ZAH, ZAU1, ZAU2 whose counter position can be altered step-by-step by means of clock pulses. The outputs of the counters are connected to inputs of AND elements in the AND field in the respectively corresponding control electronics, and, in dependence upon the counter positions of the respective counters, only a portion of the allocator is released. With the aid of the counters, the functions to be carried out by the control system can be divided into simplified sub-functions (such as U1 and U2 explained hereafter) in a very simple manner.

The input signals X, a portion of the output signals Y conveyed as signals Z and signals W which are produced from a control stage SS are conveyed to the stage ESH. The control stage SS is provided in order to carry out special functions. The control stage SS, for example, is fashioned as a known counter (e.g. T.I. SN 74 161) which is continuously switched by means of clock pulses and which is released or blocked by means of one or more output signals Y. The control stage SS can also be structured in a similar fashion as a control unit.

The input stage ESU is connected at the input side with the outputs of the allocator ZH. With the aid of the input stage ESU, the secondary functions are called which are carried out with the aid of the allocator ZU1 and ZU2. If, for example, a binary value of 1 is stored in a storage stage U1 of the input stage ESU, the allocator ZU1 is released and the secondary function represented by this allocator ZU1 is carried out. In case the binary value 1, for example, is stored in the storage stage U2 of the input stage ESU, the subfunction represented by the allocator ZU2 is carried out in accordance therewith. It is also possible to carry out two subfunctions simultaneously.

It is assumed that the counter ZAH which controls the chronological flow of the main function has the counter position 0. Thus, only those portions are released in the allocator ZH which are allocated to this counter position. If, for example, the main function consists of three steps, the counter ZAH consecutively assumes the step-by-step counter position 0, 1, 2. If a subfunction, dependent upon the main function is to be carried out, the respective allocator is called with the aid of a control signal SU via the input stage ESU. With control by the respective counter ZAU, the execution of the respective subfunctions is controlled. During the execution of the subfunction, a continuous switching of the counter ZAH is prevented with the aid of output signals Y. After the execution of the subfunction is concluded, the counter ZAH is again released and the next step of the main function is carried out. When the last step of the main function has been carried out, a respective output signal Y results. The counter ZAH can thus be reset to its initial value.

Figure 3:
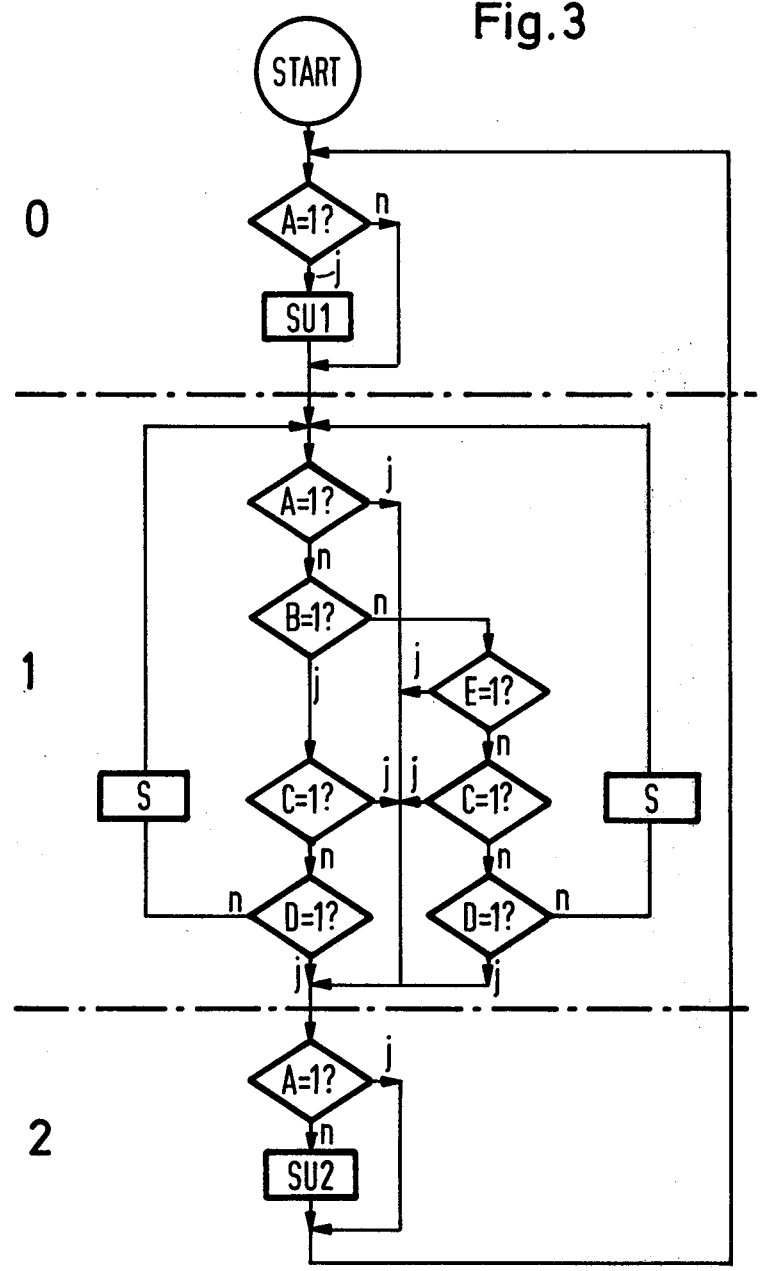
FIG. 3 shows a flow diagram of a function to be controlled by the control system.

In the flow diagram of a main function to be carried out by the control system as illustrated in FIG. 3, the diamond-shaped boxes represent interrogations in a fashion similar to program flow diagrams. The rectangular boxes indicate that a specific command is to be carried out. The main function, for example, consists of three steps 0, 1 and 2. In the steps 0 and 2 a subfunction U1 or U2 is respectively carried out.

Figure 4:
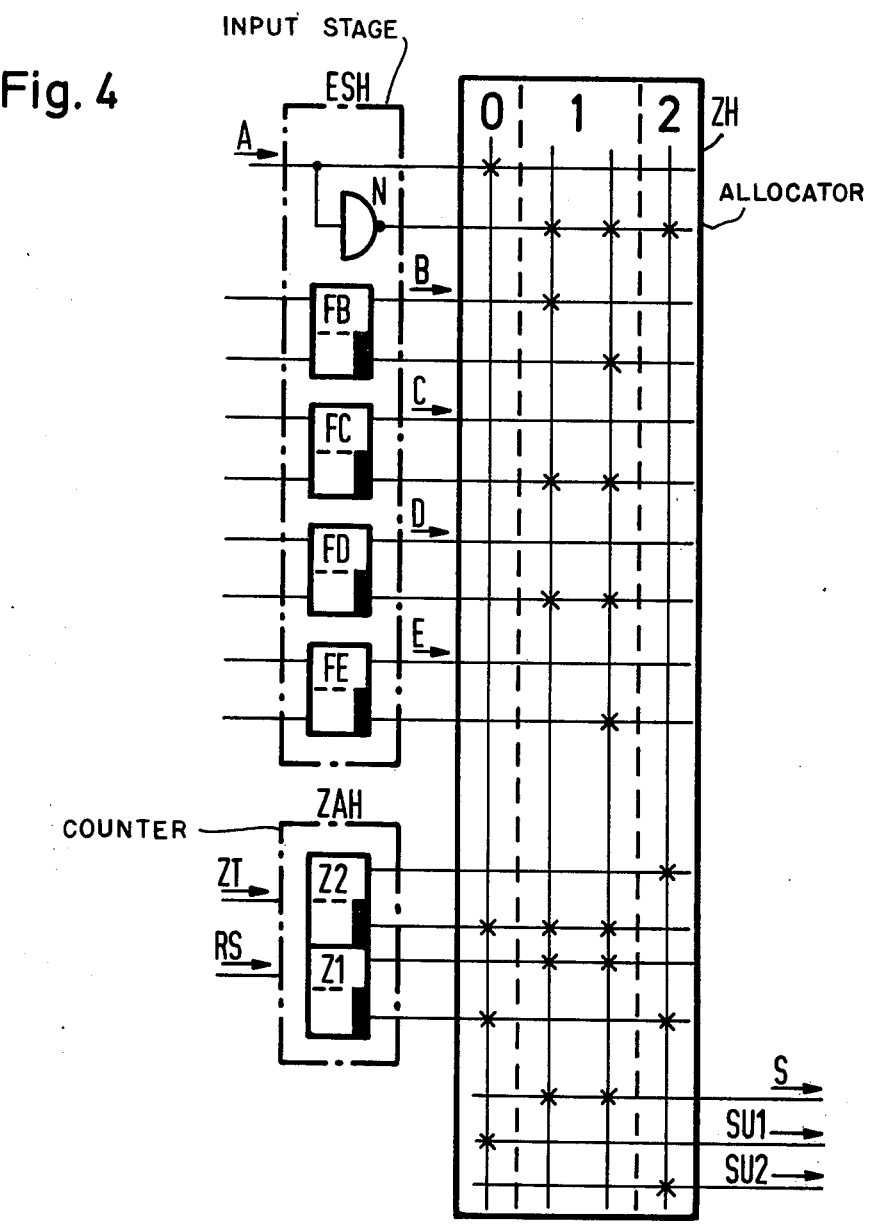
FIG. 4 shows a circuit diagram of a portion of the control system.

Additional details of FIG. 3 are described in conjunction with the circuit diagram illustrated in FIG. 4.

The circuit diagram illustrated in FIG. 4 exhibits a portion of the control unit provided with the allocator ZH. The control unit carries out the main function illustrated in FIG. 3. The control unit contains the allocator ZH and the input stage ESH which consists of four flip flops FB through FE and an inverter N. Furthermore, the input stage contains the counter ZAH which is formed by the counter stages Z1 and Z2 and is actuated by a counting pulse ZT. The allocator ZH consists of an AND field which is formed by the vertical lines and the horizontal lines at the outputs of the input stage ESH and the counter ZAH. An OR field is formed of the horizontal lines at which the signals S and also SU1 and SU2 are given off. The cross marks at the intersections of the lines respectively indicate which signals are conveyed to the inputs of the AND or OR elements.

At the beginning of the main function at the starting point in FIG. 3, the counter ZAH has a counter position of 0 and the first step of the main function is carried out. The signals at the inverting outputs of the counter stages Z1 and Z2 have the binary value of 1. The first step of the main function interrogates whether the signal A provided at the output of the input stage ESH has the binary value of 1. The signal A is therefore conveyed to an input of an AND element in the AND field where the signals at the inverting outputs of the counter stages Z1 and Z2 are conveyed to the additional inputs of the AND element. If the signal A has the binary value of 1, the signal SU1 results at the output of the allocator which sets the storage stage U1 in the input stage ESU and causes a flow of a subfunction U1'. If the signal A does not have the binary value of 1, no signal is given off at the output of the allocator ZH.

When a counting pulse ZT appears at the input of the counter ZAH, it assumes the counter position 1 and the second stage of the main function is carried out. Signals with the binary value of 1 result at the non-inverting output of the counting stage Z1 and at the inverting output of the counting stage Z2 during the second step. If the signals A, C, and D have the binary value of 0 during this second step and if the signal B simultaneously has the binary value of 1, the signal S results at the output of the allocator ZH in accordance with the flow diagram in FIG. 3. This signal S is also present when the signals A, B, C, D, and E have the binary value of 0. The signal S prevents clock pulses ZT for the counter ZAH so that the counter position of the counter ZAH does not change as long as S has the logic binary value of 1.

By means of an additional clock pulse ZT, the counter position of the counter ZAH is increased to 2 in order to carry out the third step of the main function. Signals with the binary value of 1 are given off at the inverting output of the counting stage Z1 and at the non-inverting output of the counting stage Z2. In case the signal A has the binary value of 0 during the third step and thus the signal inverted by means of the inverter N has the binary value of 1, a signal SU2 results at the output of the allocator ZH which sets the storage stage U2 in the input stage ESU. By means of a signal at the output of the storage stage U2, the allocator ZU2 is called and the subfunction U2' is carried out. In a manner similar to the carrying out of the subfunction U1', the counter ZAU2 is continuously switched step-by-step during the execution of the subfunction U2' and signals assigned to the individual steps of the subfunction U2' are given off as singals Y at the output of the control system. In case the signal A has the binary value of 1 in the third step of the main function, no signal is given off at the output of the allocator ZH.

With the aid of a signal RS, which is conveyed to the counter ZAH, the counter can be reset to an initial counter position. The signal RS, for example, may be provided at the output of the allocator ZU2 after the subfunction U2' is carried out.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A control system for controlling a chronological flow of functions in teletypewriters and data typewriters which generate input signals which are connected to the control system for releasing carrying-out of the functions, said control system producing a plurality of output signals allocated to individual steps of the functions which are carried out at successive points in time, comprising:
    (a) a plurality of control unit means, each control unit means having an allocator formed of binary linkage elements;
    (b) an input stage means connected to the control units for receiving the generated input signals;
    (c) the control unit means producing control signals in dependence upon the input signals; and
    (d) a portion of the control signals being conveyed back to the input stage means and a portion of the control signals forming said plurality of output signals allocated to individual steps of the functions carried out at successive points in time.

2. A control system in accordance with claim 1 in which the control unit means are hierarchically arranged, a first control unit means (ZH, ESH) controlling execution of a main function, and other control unit means controlling execution of sub-functions.

3. A control system in accordance with claim 1 in which the control unit means are arranged in parallel, each control unit means controlling execution of at least one function.

4. A control system in accordance with claim 1 in which each control unit means has a counter means stepped up by counting timing pulses, said counter means having outputs connected to inputs of the allocator in each control unit.

5. A control system in accordance with claim 1 in which at least one control stage means is provided for carrying out special functions, said control stage means having inputs at which control signals are connected, and having outputs connected to the input stage means.

6. A control system for controlling a chronological flow of a function in teletypewriters and data typewriters, comprising:
    (a) input signals releasing a carrying-out of the function;
    (b) a main input stage connected to receive the input signals;
    (c) a main allocator formed of binary linkage elements connected to the main input stage;
    (d) a plurality of additional allocators each formed of binary linkage elements;
    (e) an additional input stage connected to the additional allocators;
    (f) a plurality of control signals produced by the main allocator and additional allocators, a first portion of the control signals being fed back to the main input stage, a second portion of the control signals being fed back to the additional input stage, and a third portion of the control signals being allocated to individual steps of the function;
    (g) the main allocator and input stage forming a main control unit means for controlling execution of the function; and
    (h) the additional allocators and additional input stage forming a plurality of additional control unit means for controlling execution of sub-functions.

7. The system of claim 6 in which an individual counter means is provided for each allocator.

* * * * *